(12) United States Patent
Kwon (10) Patent No.: US 11,233,736 B2
(45) Date of Patent: Jan. 25, 2022

(54) VEHICLE GATEWAY AND METHOD OF CONTROLLING THE SAME

(71) Applicants: HYUNDAI MOTOR COMPANY, Seoul (KR); KIA MOTORS CORPORATION, Seoul (KR)

(72) Inventor: Soonwoo Kwon, Uiwang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/924,324

(22) Filed: Jul. 9, 2020

(65) Prior Publication Data

US 2021/0184973 A1   Jun. 17, 2021

(30) Foreign Application Priority Data

Dec. 11, 2019   (KR) .......................... 10-2019-0164844

(51) Int. Cl.
*H04L 12/66* (2006.01)
*H04L 29/08* (2006.01)
*H04L 12/40* (2006.01)
*H04L 12/801* (2013.01)

(52) U.S. Cl.
CPC .............. *H04L 47/12* (2013.01); *H04L 12/66* (2013.01); *H04L 67/12* (2013.01); *H04L 2012/40215* (2013.01); *H04L 2012/40273* (2013.01)

(58) Field of Classification Search
CPC ......... H04L 47/12; H04L 67/12; H04L 12/66; H04L 2012/40215; H04L 2012/40273
See application file for complete search history.

(56) References Cited

U.S. PATENT DOCUMENTS

| 2015/0010017 | A1* | 1/2015 | Kraly | ............... H04L 12/40032 370/468 |
| 2015/0237174 | A1* | 8/2015 | Brochi | ............... H04L 12/6418 370/474 |
| 2019/0020499 | A1* | 1/2019 | Meier | ................... G06F 13/376 |
| 2019/0182074 | A1* | 6/2019 | Muth | ............... H04L 12/40032 |
| 2020/0374151 | A1* | 11/2020 | Meier | ..................... H04L 12/40 |

* cited by examiner

*Primary Examiner* — Kent Krueger
(74) *Attorney, Agent, or Firm* — McDonnell Boehnen Hulbert & Berghoff LLP (57) ABSTRACT

Provided is a vehicle gateway including a first transceiver configured to receive a controller area network with flexible data rate (CAN-FD) message from a CAN-FD bus and store the received CAN-FD message, a second transceiver configured to store a controller area network (CAN) message and transmit or receive the CAN message to or from a CAN bus, and a processor configured to divide the CAN-FD message into a plurality of divided CAN-FD messages based on preset reference bytes, assign identification numbers (IDs) to the plurality of divided CAN-FD messages, and store a plurality of the CAN messages assigned with the IDs in the second transceiver.

18 Claims, 10 Drawing Sheets

VEHICLE GATEWAY AND METHOD OF CONTROLLING THE SAME

CROSS REFERENCE TO RELATED APPLICATIONS

This application is based on and claims priority under 35 U.S.C. § 119 to Korean Patent Application No. 10-2019-0164844, filed on Dec. 11, 2019, the disclosure of which is incorporated herein by reference.

BACKGROUND

1. Field

The disclosure relates to a vehicle gateway for routing controller area network (CAN) communication and CAN with flexible data rate (CAN-FD) communication.

2. Description of the Related Art

With development of technology for vehicles, vehicles are providing not only a driving function, which is a basic function of vehicles, but also other various functions for user's convenience. In order to perform the functions, the vehicles are provided with various parts or devices, and various controllers (e.g., electronic control units: ECUs) controlling corresponding parts or devices.

Controllers provided in conventional vehicles exchange information with each other through a CAN. However, as control devices have been developed to require various functions and large amount of data, a communication load (Bus Load) in a network has increased, and communication signal latency has occurred. Accordingly, a CAN-FD protocol, which transmits larger data than that of CAN used in the conventional vehicles and increases the communication speed, has been applied to the vehicle.

In order to communicate between a controller using CAN-FD and a controller using CAN, a need for a technology that route large amount of data from CAN-FD to CAN arises.

SUMMARY

Therefore, it is an object of the disclosure to provide a vehicle gateway that divides a CAN-FD message transmitted over CAN-FD to prevent a load from being increased at a reception side controller that uses CAN having a data size and a transfer rate different from those of CAN-FD, and a method of controlling the same.

Additional aspects of the disclosure will be set forth in part in the description which follows and, in part, will be obvious from the description, or may be learned by practice of the disclosure.

Therefore, it is an aspect of the disclosure to provide a vehicle gateway including a first transceiver configured to receive a controller area network with flexible data rate (CAN-FD) message from a CAN-FD bus and store the received CAN-FD message, a second transceiver configured to store a controller area network (CAN) message and transmit or receive the CAN message to or from a CAN bus, and a processor configured to divide the CAN-FD message into a plurality of divided CAN-FD messages based on preset reference bytes, assign identification numbers (IDs) to the plurality of divided CAN-FD messages, and store a plurality of the CAN messages assigned with the IDs in the second transceiver.

The processor may control the second transceiver such that the plurality of CAN messages are transmitted based on a preset period.

The processor may assign a same ID to the received CAN-FD message when the CAN-FD message has a size equal to the preset reference bytes.

The processor may determine whether the plurality of CAN messages need to be transmitted, and based on a result of the determination, transmit some of the plurality of CAN messages.

The processor may compare a bus load of the CAN bus with a reference value, and based on a result of the comparison, transmit some of the plurality of CAN messages.

The processor may determine whether to adjust the preset period when the bus load exceeds the reference value.

The processor may adjust the preset period based on a controller that is to receive the plurality of CAN messages, and transmit the plurality of CAN messages based on the adjusted preset period.

The processor may adjust the preset period based on a period requested by the controller that is to receive the plurality of CAN messages.

The processor, based on a result whether the preset period has been adjusted, may compare CAN messages respectively divided from a first CAN-FD message and a second CAN-FD message and having the same ID with each other among the plurality of CAN messages.

The processor may transmit a CAN message having a change in data among the plurality of CAN messages based on a result of the comparison.

It is another aspect of the disclosure to provide a vehicle gateway including a first controller configured to generate a controller area network with flexible data rate (CAN-FD) message, a second controller configured to generate a controller area network (CAN) message, and the vehicle gateway configured to route the CAN-FD message and the CAN message. The vehicle gateway includes a first transceiver configured to receive the CAN-FD message from the first controller and store the received CAN-FD message, a second transceiver configured to store the CAN message and transmit or receive the stored CAN message to or from the second controller, and a processor configured to divide the CAN-FD message into a plurality of divided CAN-FD messages based on preset reference bytes, assign identification numbers (IDs) to the plurality of divided CAN-FD messages, and store a plurality of the CAN messages assigned with the IDs in the second transceiver through the second transceiver.

It is another aspect of the disclosure to provide a method of controlling a vehicle gateway, the method including receiving a controller area network (CAN) with flexible data rate (CAN-FD) message from a CAN-FD bus, dividing the CAN-FD message into a plurality of divided CAN-FD messages based on preset reference bytes, assigning identification numbers (IDs) to the plurality of divided CAN-FD messages, storing a plurality of the CAN messages assigned with the IDs, and transmitting the stored CAN message to a CAN bus.

The method may further include transmitting the plurality of CAN messages based on a preset period.

The assigning of the IDs may include assigning a same ID to the received CAN-FD message when the CAN-FD message has a size equal to the preset reference bytes.

The transmitting may include determining whether the plurality of CAN messages need to be transmitted, and based on a result of the determination, transmitting some of the plurality of CAN messages.

The transmitting may include comparing a bus load of the CAN bus with a reference value, and based on a result of the comparison, transmitting some of the plurality of CAN messages.

The transmitting may include determining whether to adjust the preset period when the bus load exceeds the reference value.

The transmitting may include adjusting the preset period based on a controller that is to receive the plurality of CAN messages, and transmitting the plurality of CAN messages based on the adjusted preset period.

The transmitting may include adjusting the preset period based on a period requested by a controller that is to receive the plurality of CAN messages.

The transmitting may include, based on a result whether the preset period has been adjusted, comparing CAN messages respectively divided from a first CAN-FD message and a second CAN-FD message and having the same ID with each other among the plurality of CAN messages, and transmitting a CAN message having a change in data among the plurality of CAN messages based on a result of the comparison.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

Hereinafter, the principles and embodiments of the disclosure will be described with reference to the accompanying drawings.

Figure 1:
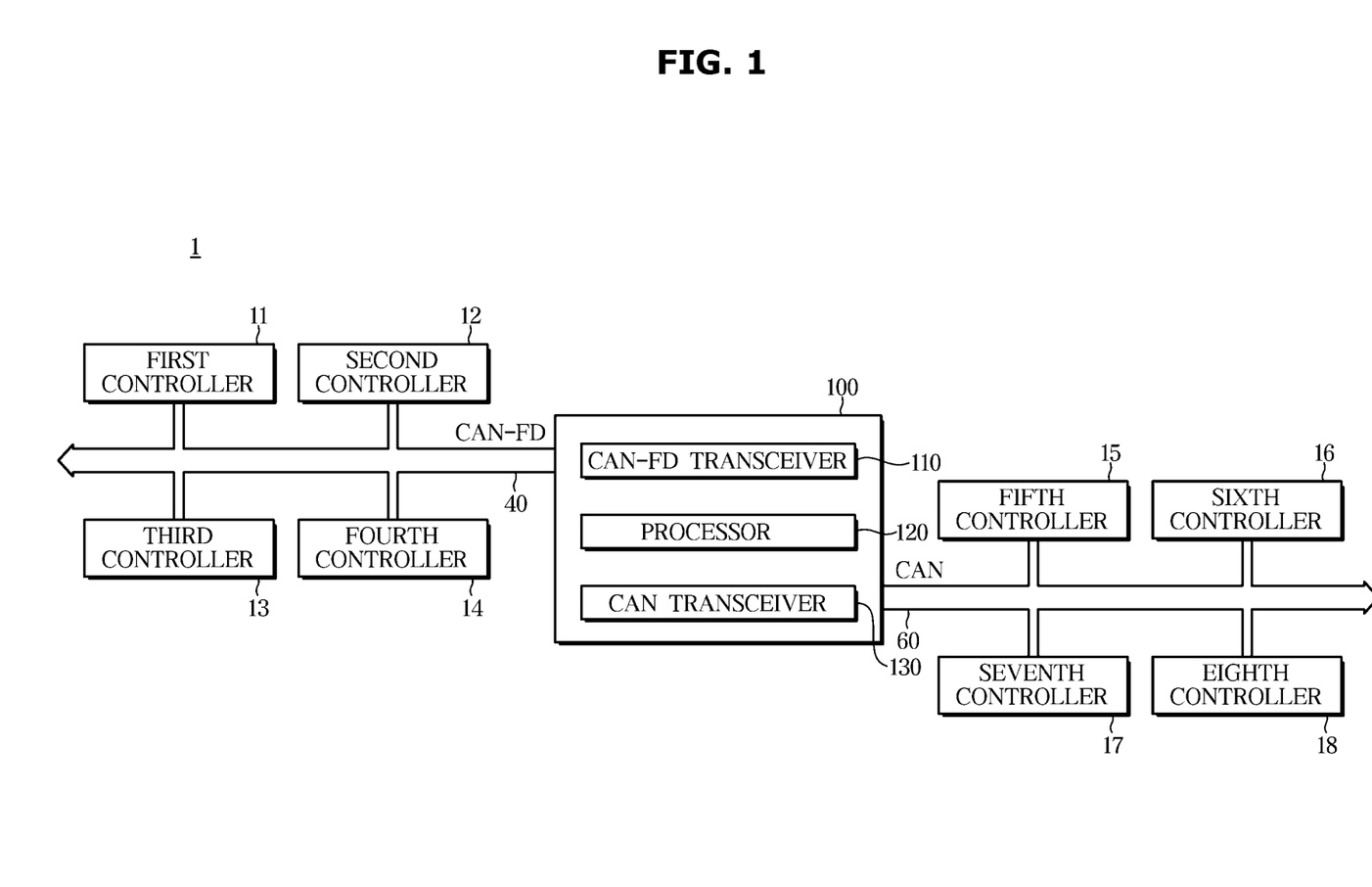
FIG. 1 is a control block diagram illustrating a vehicle according to an embodiment.

FIG. 1 is a control block diagram illustrating a vehicle according to an embodiment.

Referring to FIG. 1, the vehicle 1 may include a plurality of controllers including first to fourth controllers 11 to 14 that transmit and receive data through a controller area network with an Flexible Data Rate (CAN-FD) bus 40, a plurality of controllers including fifth to eighth controllers 15 to 18 that transmit and receive data through a controller area network (CAN) bus 60, and a gateway 100 for routing data transmitted by the plurality of controllers 11 to 18.

The plurality of controllers 11 to 14 transmit and receive data between each other via CAN-FD. For example, the first controller 11 transmits data (hereinafter, referred to as a CAN-FD message) to the second to fourth controllers 12 to 14 via the CAN-FD bus 40.

CAN-FD has a data size of 64 bytes and a data transfer rate of up to 8 Mbps, while CAN protocol has a data size of 8 bytes and a data transfer rate of 1 Mbps.

The plurality of controllers 15 to 18 exchange data via controller area network (CAN). For example, the fifth controller 15 transmits data (hereinafter, referred to as a CAN message) to the sixth, seventh, and eighth controllers 16 to 18 through the CAN bus 60.

The first to eighth controllers 11 to 18 refer to electronic control devices generally used in the vehicle 1. In detail, the first to eighth controllers 11 to 18 may include a plurality of electronic control devices that are respectively mounted for a power train, a chassis, and a body. For example, a vehicle speed sensor (VSS), which measures the speed of the vehicle in the powertrain and adjusts the fuel injection amount according to the speed of the vehicle, may transmit a CAN-FD message to an engine control module (ECM) that controls an engine in the chassis through the CAN-FD bus 40.

On the other hand, according to embodiments of the vehicle 1, even in the electronic control device, data may be transmitted through a CAN protocol rather than a CAN-FD protocol. For example, according to an embodiment, a VSS of a vehicle may transmit a CAN-FD message via the CAN-FD bus 40. However, according to another embodiment, a VSS of a vehicle may transmit a CAN message via the CAN bus 60. That is, the controller described above in FIG. 1 may be implemented using any electronic control device for a vehicle that uses a CAN-FD protocol and/or a CAN protocol.

The first, second, third, and fourth controllers 11-14 may transmit a CAN-FD message to the fifth, sixth, seventh, or eights controllers 15-18 using the CAN protocol. In addition, the fifth, sixth, seventh, and eighth controllers 15-18 may transmit a CAN message to the first, second, third, and fourth controllers 11-14 using the CAN-FD protocol.

The gateway 100 performs routing for converting data that are to be transmitted with different protocols and designating a route.

In detail, the gateway 100 may include a CAN-FD transceiver 110, a processor 120, and a CAN transceiver 130.

The CAN-FD transceiver 110 (hereinafter, referred to as a first transceiver) may include a buffer for storing a CAN-FD messages received through the CAN-FD bus 40 and a communicator (not shown) for transmitting the stored CAN-FD message to the first controller 11 to the fourth controller 14.

The CAN transceiver 130 (hereinafter, referred to as a second transceiver) may include a buffer for storing a CAN message received through the CAN bus 60 and a communicator (not shown) for transmitting the stored CAN messages to the fifth controller 15 to the eighth controller 18.

The processor 120 is configured to perform overall control on the gateway 100, and controls the first transceiver 110 and the second transceiver 130.

In detail, the processor 120 divides a CAN-FD message into a plurality of divided CAN-FD messages based on preset reference bytes. The processor 120 assigns identification numbers (IDs) to the plurality of divided CAN-FD messages, to thereby generate CAN messages. The processor 120 stores the generated CAN messages in the second transceiver 130, and transmits the CAN messages according to a communication load of the CAN bus 60.

In addition to converting the CAN-FD message to the CAN message, the processor 120 may route the CAN message to the CAN-FD message. However, routing small data to large data does not significantly affect the communication load. Hereinafter, embodiments of routing a CAN-FD message with large data size to a CAN message will be described in detail with reference to the accompanying drawings.

Figure 2:
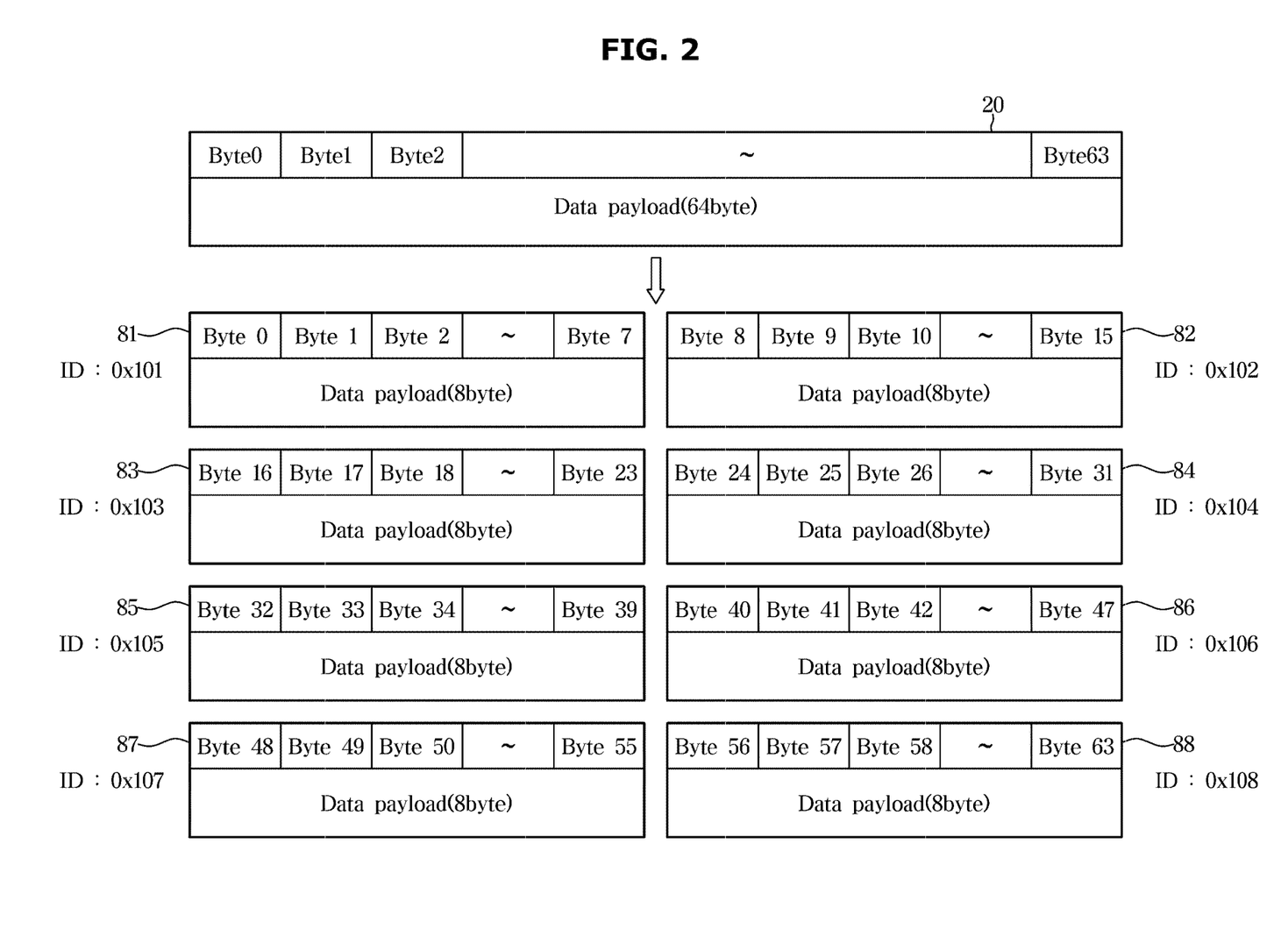
FIGS. 2 and 3 are diagrams for describing an operation of a gateway according to a first embodiment.
Figure 3:
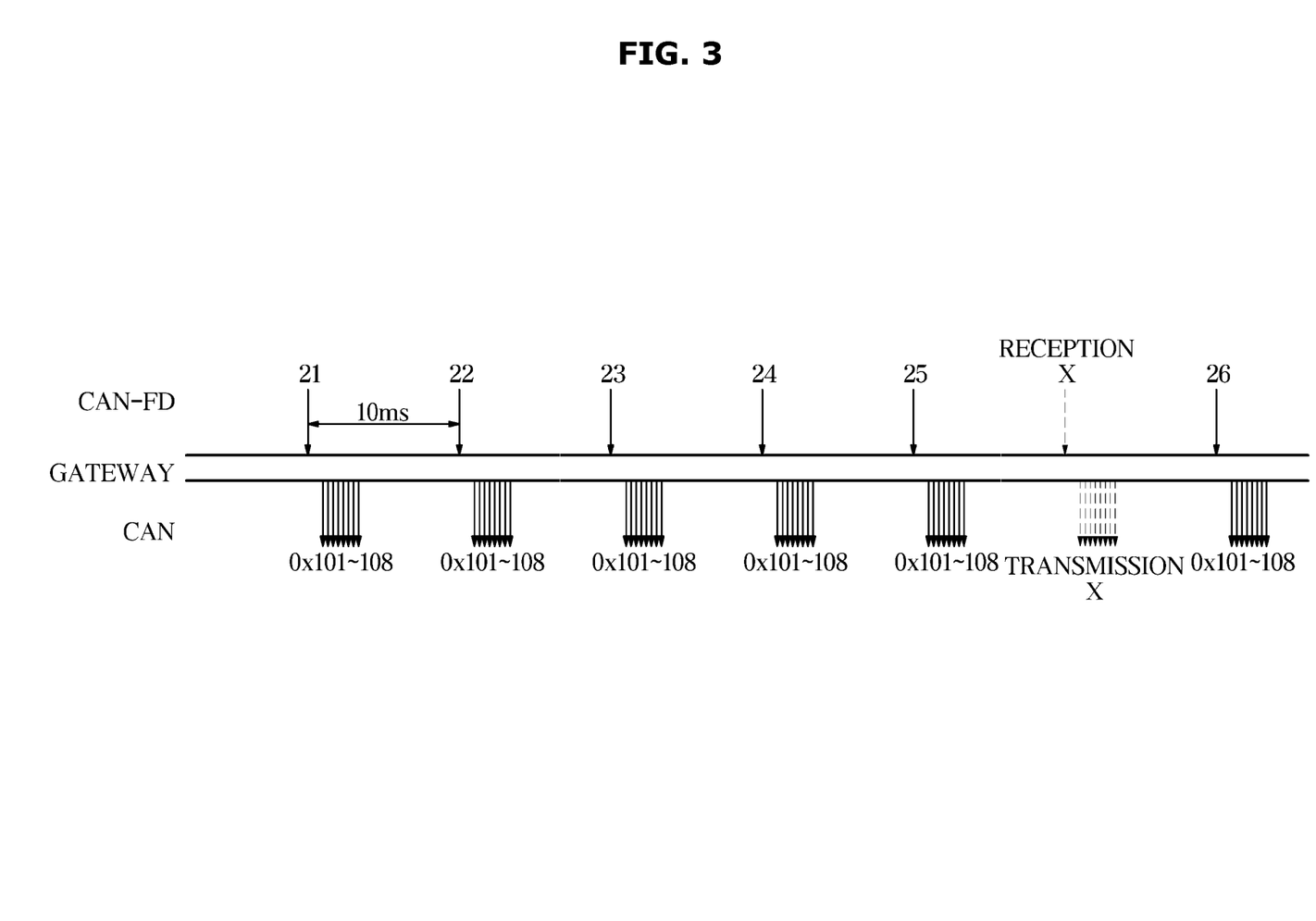

FIGS. 2 and 3 are diagrams for describing an operation of a gateway according to the first embodiment.

The gateway 100 receives a CAN-FD message 20 from the CAN-FD bus 40.

After determining the frame size of the CAN-FD message 20, the gateway 100 divides the CAN-FD message 20 based on preset reference bytes. The gateway 100 assigns ID to the divided CAN-FD messages to thereby generate CAN messages.

Referring to FIG. 2, the CAN-FD message 20 may have a size of 64 bytes. The gateway 100 divides the CAN-FD message 20 having a size of 64 bytes based on 8 bytes, which is preset reference bytes. That is, the gateway 100 may divide the CAN-FD message 20 into eight CAN messages 81 to 88 each having a frame size of 8 bytes.

The gateway 100 assigns different IDs (0×101 to 0×108) to the CAN messages 81 to 88. The gateway 100 according to the embodiment may sequentially increase the ID to be assigned.

Meanwhile, the frame size of the CAN-FD message 20 may be 32 bytes. The gateway 100 may generate four CAN messages 80 by dividing the CAN-FD message 20 based on 8 bytes and assigning IDs to the divided CAN-FD messages.

Referring to FIG. 3, an arrow in a CAN-FD region indicates that the gateway 100 receives CAN-FD messages 20 from the CAN-FD bus 40. A gateway region refers to a time delayed for routing, and an arrow in a CAN region represents that divided CAN messages are transmitted through the CAN bus 60.

The gateway 100 may receive a plurality of CAN-FD messages 21 through 26 at a time interval of 10 ms.

For example, the gateway 100 may receive the first CAN-FD message 21 having a frame size of 64 bytes. The gateway 100 may divide the first CAN-FD message 21 based on the size of 8 bytes, and sequentially assign eight IDs (0×101 to 0×108). The gateway 100 may transmit eight CAN messages 81 to 88 assigned the IDs to the CAN bus 60 within the preset period of 10 ms.

Meanwhile, without receiving the CAN-FD message, the gateway 100 does not transmit a CAN message. In detail, after the gateway 100 transmits eight CAN messages generated based on the fifth CAN-FD message to the CAN bus 60, the gateway 100 may not receive the next CAN-FD message for the preset period. If a CAN-FD message is not received, the gateway 100 does not transmit CAN messages.

Figure 4:
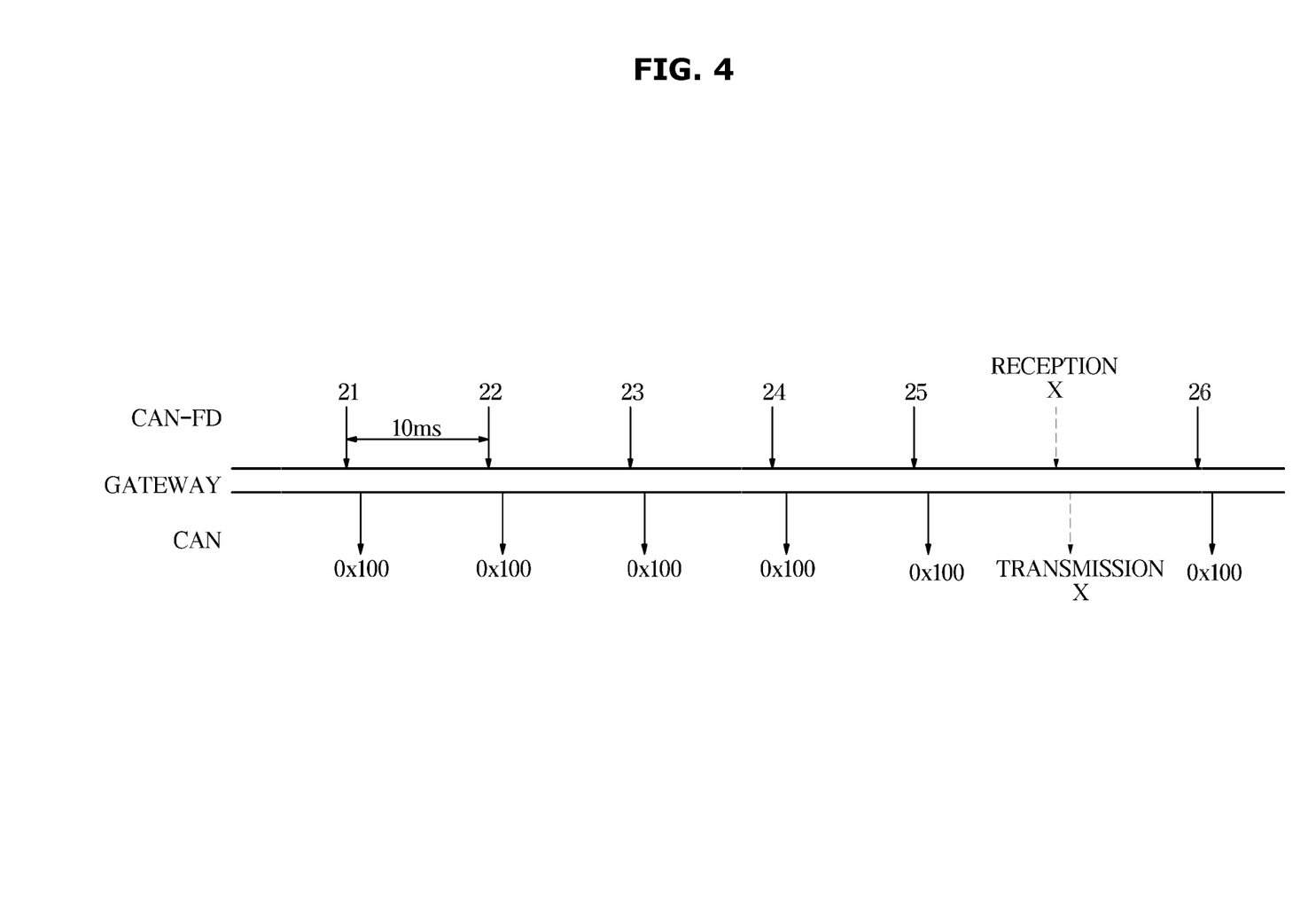
FIG. 4 is a diagram for describing an operation of a gateway according to a second embodiment.

FIG. 4 is a diagram for describing an operation of a gateway according to a second embodiment.

Referring to FIG. 4, the gateway 100 may receive a plurality of CAN-FD messages 21 to 26 at time intervals of 10 ms. Unlike FIG. 3, the gateway 100 compares the size of the CAN-FD messages 21 to 26 with preset reference bytes. The plurality of CAN-FD messages 21 to 26 may have the same size as the preset reference bytes. In this case, the gateway 100 assigns the same ID to each CAN-FD message 21 to 26.

For example, when the message length of each of the plurality of CAN-FD messages 21 to 26 is 8 bytes, the gateway 100 does not divide the CAN-FD message. The gateway 100 assigns the same ID (0×100) to each of the CAN-FD messages 21 to 26. The gateway 100 transmits six CAN messages generated by assignment of the same ID to the CAN bus 60 as shown in FIG. 4.

On the other hand, without receiving the CAN-FD message, the gateway 100 does not transmit a CAN message, similar as in FIG. 3.

Figure 5:
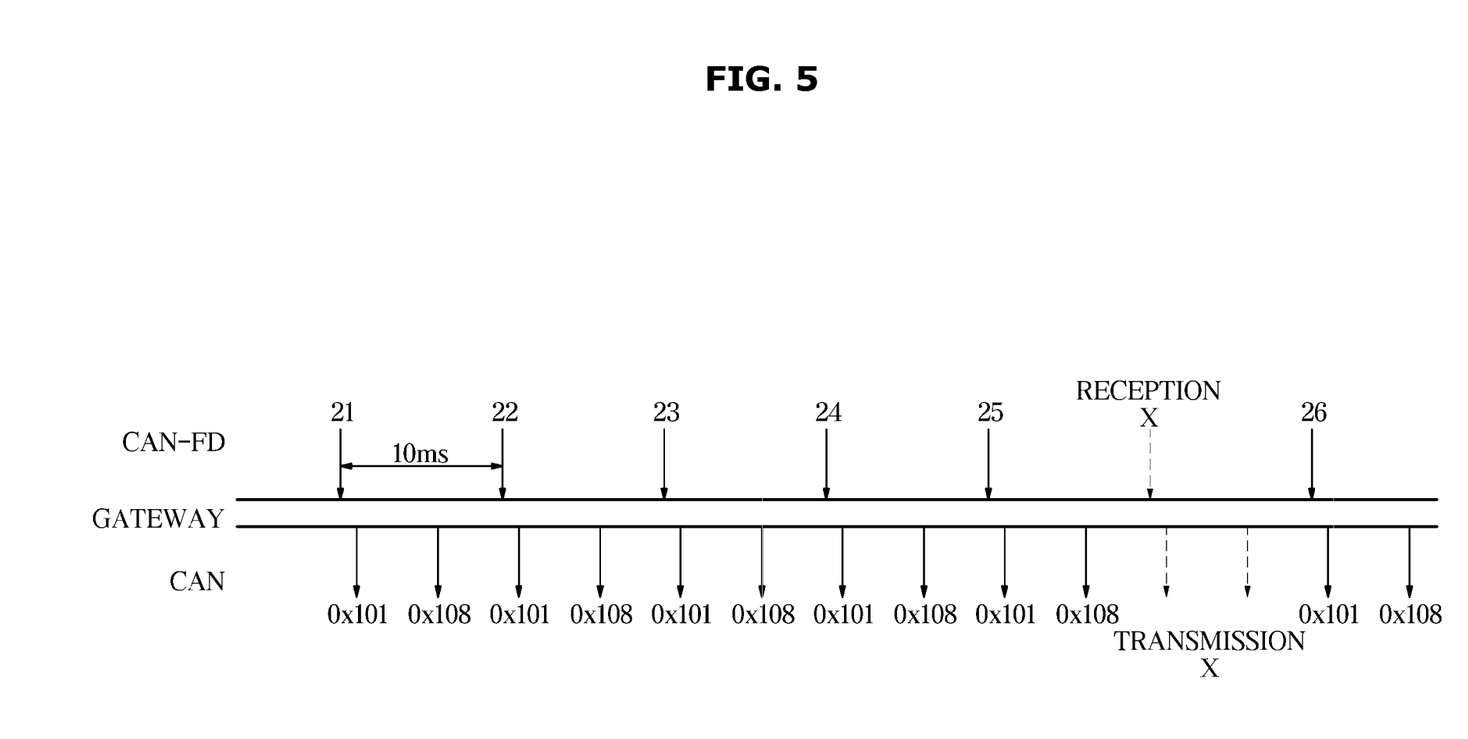
FIG. 5 is a view for describing an operation of a gateway according to a third embodiment.

FIG. 5 is a view for describing an operation of a gateway according to a third embodiment.

The gateway 100 may receive a plurality of CAN-FD messages 21 to 26 at an intervals of a preset period of 10 ms. For example, the gateway 100 may generate eight CAN messages 81 to 88 (0×101 to 0×108) from the first CAN-FD message 21 having a frame size of 64 bytes.

In detail, the gateway 100 may determine whether the plurality of CAN messages 81 to 88 need to be transmitted, and extract CAN messages needing to be transmitted. That is, the gateway 100 transmits only the first CAN message 81 and the eighth CAN message 88 that need to be received, for example, by the fifth controller 15, among the eight divided CAN messages 81 to 88.

With this configuration, the gateway 100 may reduce the communication load of the CAN bus 60.

Meanwhile, without receiving the CAN-FD message for the preset period, the gateway 100 does not transmit a CAN message, as in FIG. 3.

Figure 6:
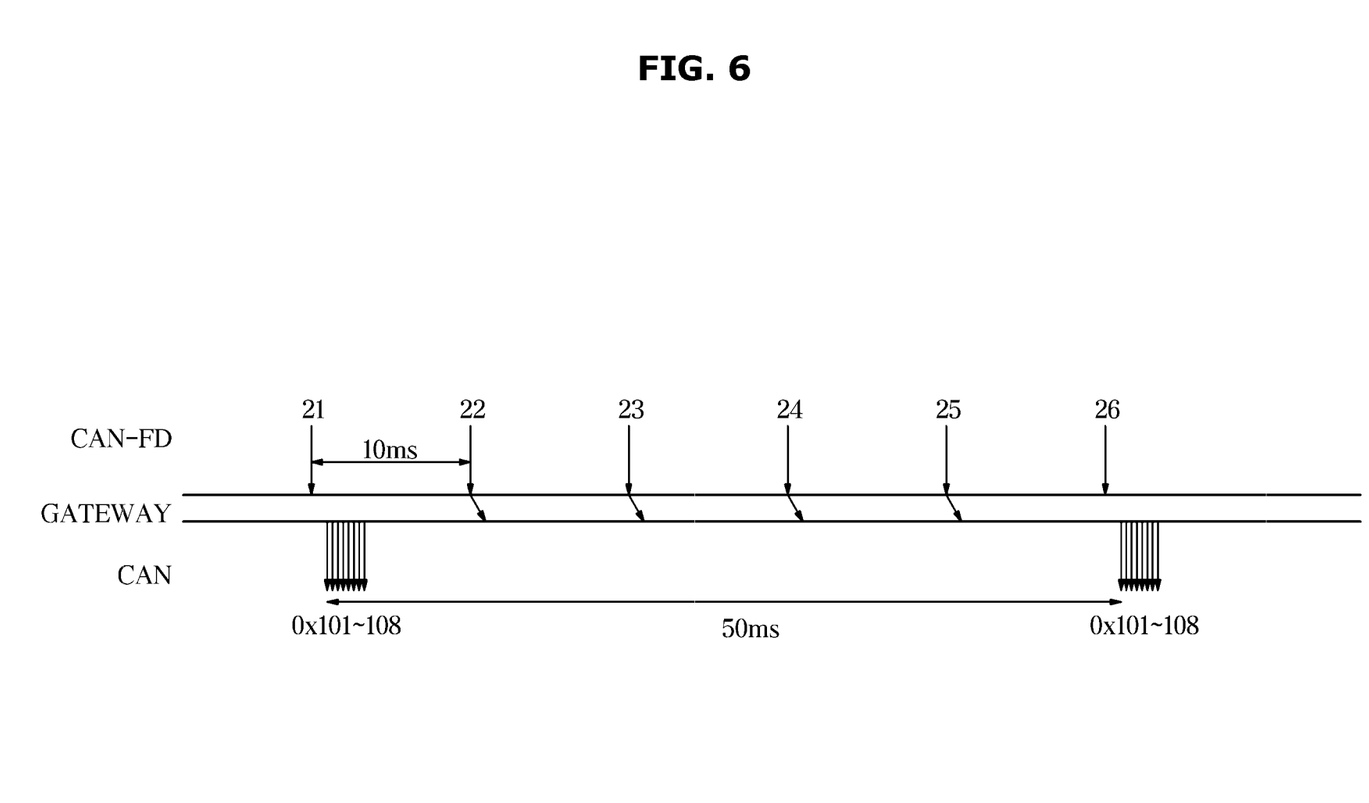
FIG. 6 is a view for describing an operation of a gateway according to a fourth embodiment.

FIG. 6 is a view for describing an operation of a gateway according to a fourth embodiment.

The gateway 100 may not transmit the generated CAN messages 81 to 88 based on the controller that is to receive the CAN messages.

As an example, the gateway 100 may check the bus load of the CAN bus 60. If the bus load is greater than or equal to a reference value, the gateway 100 may determine that all the CAN-FD messages received at the adjusted interval do not need to be transmitted.

As another example, the received CAN-FD message 20 may be safety-related data that needs to be entirely transmitted. If the data is not safety-related data, the gateway 100 may not transmit some of the plurality of received CAN-FD messages.

Referring to FIG. 6, the gateway 100 may receive the first CAN-FD message 21 to the sixth CAN-FD message 26 at a preset period of 10 ms. The gateway 100 may determine that all of the plurality of received CAN-FD messages 21 to 26 do not need to be transmitted.

The gateway 100 changes or adjusts the preset period from 10 ms to 50 ms. That is, the gateway 100 transmits eight CAN messages 81 to 88 assigned IDs (0×101 to 0×108) based on the first CAN-FD message 21 and then transmit eight CAN messages 81 to 88 assigned IDs (0×101 to 0×108) based on the sixth CAN-FD message 26 through the CAN bus 60.

The gateway 100 may store a plurality of CANs generated based on the second CAN-FD message 22, the third CAN-FD message 23, the fourth CAN-FD message 24, and the fifth CAN-FD message 25, and may not transmit the plurality of stored CAN messages.

Meanwhile, the period adjusted by the gateway 100 may be adjusted by a request of a controller that is to receive a CAN message.

For example, the gateway 100 may be requested to transmit CAN messages at a period of 50 ms as requested by the fifth controller 15 ms. After eight CAN messages 81 to 88 generated based on the first CAN-FD message 21 are transmitted, the gateway 100 may transmit eight CAN messages 81 to 88 generated based on the sixth CAN-FD message 26 to the fifth controller 15.

Figure 7:
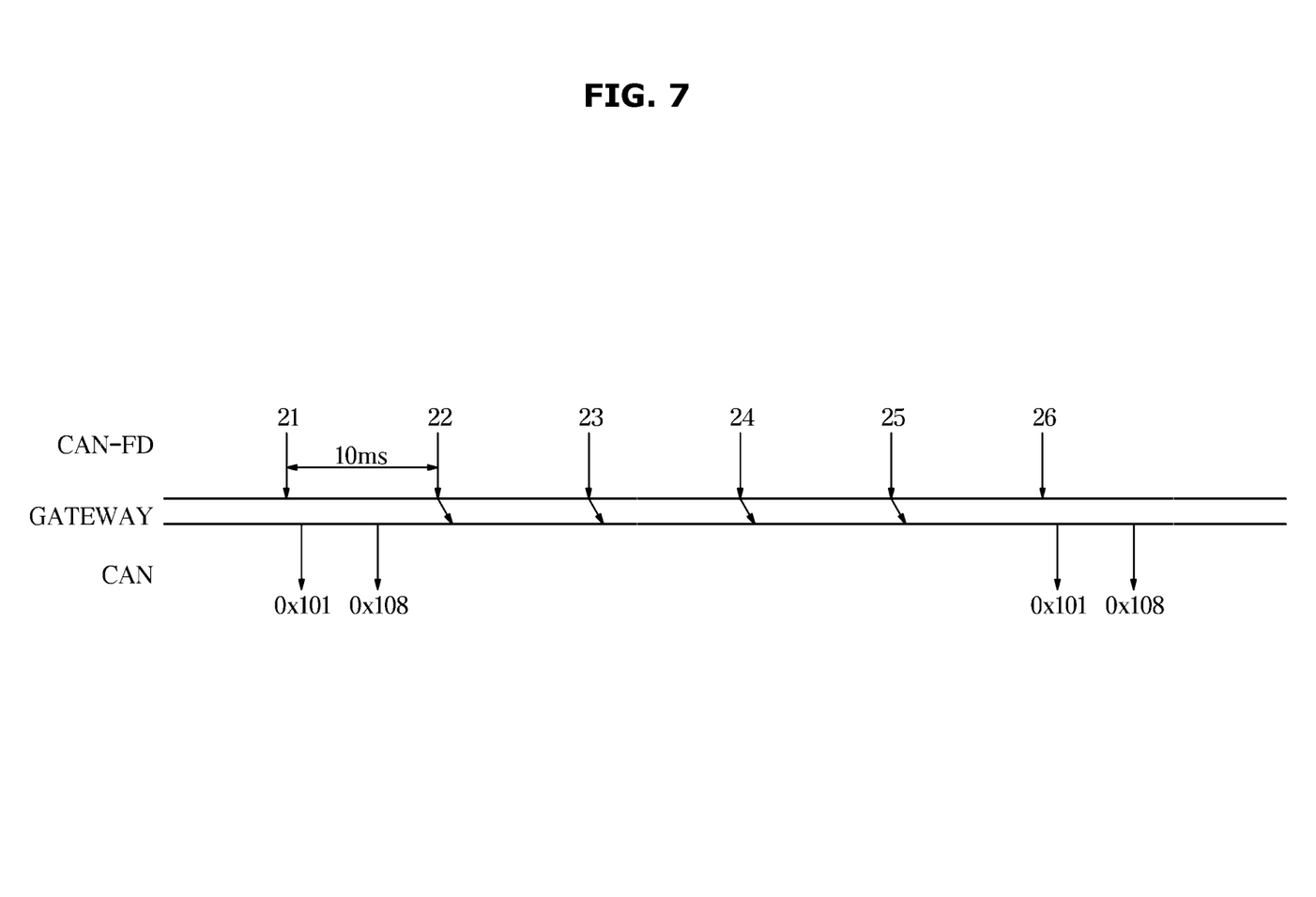
FIG. 7 is a view for describing an operation of a gateway according to a fifth embodiment.

FIG. 7 is a view for describing an operation of a gateway according to a fifth embodiment.

As described above in FIG. 6, the gateway 100 may adjust a preset period based on a bus load of the CAN bus and a request of a controller that is to receive a CAN message. Additionally, the gateway 100 may adjust the preset period when only some of the generated CAN messages are transmitted based on the determination of the need to transmit the CAN messages.

In detail, the gateway 100 may receive the first CAN-FD message 21 to the sixth CAN-FD message 26 at a preset period of 10 ms. The gateway 100 generates eight CAN messages 81 to 88 by dividing the first CAN-FD message 21 into eight CAN-FD messages based on 8 bytes and assigning IDs (0×101 to 0×108) to the divided CAN-FD messages.

Before transmission, the gateway 100 determines whether all the eight CAN messages 81 to 88 need to be transmitted, and determines to transmit the first CAN message 81 and the eighth CAN message 88 according to the determination result.

If the bus load of CAN data is overloaded and at the same time the fifth controller 15 requests to adjust the preset period into 50 ms, the gateway 100 may not route the second CAN-FD message 22, the third CAN-FD, the fourth CAN-FD message 24 and the fifth CAN-FD message 25, and transmit only the first CAN message 81 and the eighth CAN message 88 to the fifth controller 15 at the adjusted period of 50 ms.

Figure 8:
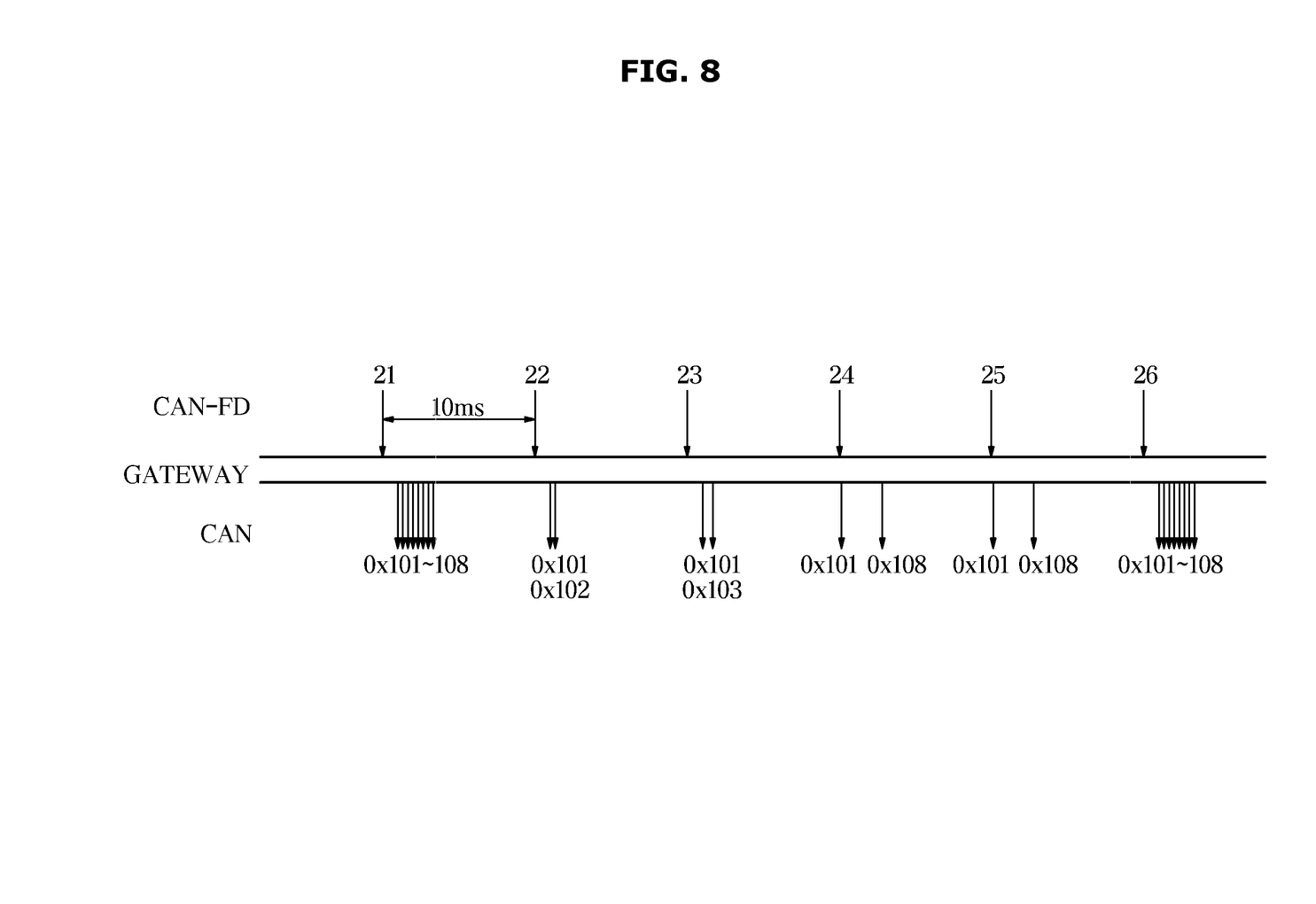
FIG. 8 is a view for describing an operation of a gateway according to a sixth embodiment.

FIG. 8 is a view for describing an operation of a gateway according to a sixth embodiment.

The gateway 100 may receive a plurality of CAN-FD messages 21 to 26. Unlike FIG. 6 and FIG. 7, the gateway 100 may not adjust the period or may have difficulty omitting transmission of part of CAN messages. However, in order to reduce the communication load, the gateway 100 may perform an operation according to the sixth embodiment.

In detail, the gateway 100 stores the eight CAN messages 81 to 88 assigned IDs 0×101 to 0×108 based on the first CAN-FD message 21 in the second transceiver 130. The gateway 100 transmits the stored eight CAN messages 81 to 88 via the CAN bus 60.

The gateway 100 receives the second CAN-FD message 22. The gateway 100 compares the first CAN-FD message 21 with the second CAN-FD message 22. In detail, the gateway 100 compares CAN messages respectively generated from the first CAN-FD message 21 and the second CAN-FD message 22 and having the same ID each other, with respect to eight CAN messages 81 to 88 messages generated from the first CAN-FD messages 21 and eight CAN messages 81 to 88 messages generated from the second CAN-FD messages 22.

If CAN messages having the same ID are duplicated between the CAN messages generated from the first and second CAN-FD message 21 and 22, the gateway 100 does not transmit the duplicated CAN message among the eight CAN messages 81 to 88 generated from the second CAN-FD message 22.

The gateway 100 may determine that, among eight CAN messages 81 to 88 generated from the second CAN-FD message 22, the first CAN message 81 assigned an ID of 0×101 and the second CAN message 82 assigned an ID of 0×102 are different from the CAN messages generated from the first CAN-FD message 21. The gateway 100 may transmit only the first CAN message 81 and the second CAN message 82 to the CAN bus 60 for the preset period of 10 ms.

The gateway 100 may determine that, among eight CAN messages 81 to 88 generated from the third CAN-FD message 23, the first CAN message 81 assigned an ID of 0×101 and the third CAN message 83 assigned an ID of 0×103 are different from the CAN messages generated from the second CAN-FD message 22. The gateway 100 may transmit only the first CAN message 81 and the third CAN message 83 to the CAN bus 60 for the preset period of 10 ms.

The gateway 100 may determine that, among eight CAN messages 81 to 88 generated from the fourth CAN-FD message 24, the first CAN message 81 assigned an ID of 0×101 and the eighth CAN message 88 assigned an ID of 0×108 are different from the CAN messages generated from the third CAN-FD message 23. The gateway 100 may transmit only the first CAN message 81 and the eighth CAN message 88 to the CAN bus 60 for the preset period of 10 ms.

The gateway 100 may determine that, among eight CAN messages 81 to 88 generated from the fifth CAN-FD message 25, the first CAN message 81 assigned an ID of 0×101 and the eighth CAN message 88 assigned an ID of 0×108 are different from the CAN messages generated from the fourth CAN-FD message 23. The gateway 100 may transmit only the first CAN message 81 and the eighth CAN message 88 to the CAN bus 60 for the preset period of 10 ms.

The gateway 100 transmits eight CAN messages 81 to 88 generated from the sixth CAN-FD message 26 to the CAN bus 60 after 50 ms.

As a result, the gateway 100 according to the sixth embodiment omits transmission of the CAN message including the same data as the recently transmitted CAN-FD message through comparison with the recently transmitted CAN-FD message, so that even without changing the period, the communication load may be reduced when the bus load is overloaded, similar to FIG. 6 or 7.

Figure 9A:
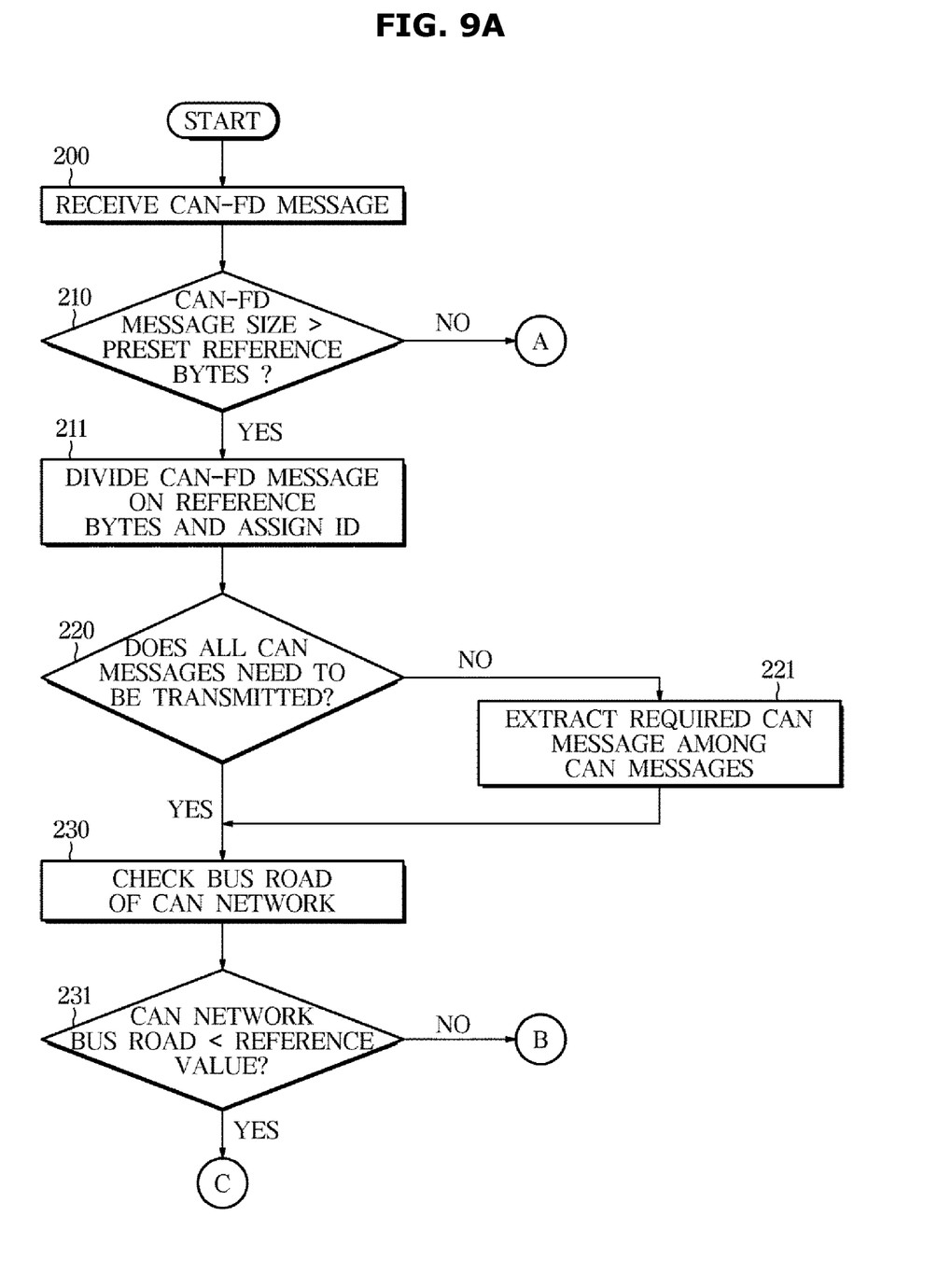
FIGS. 9A and 9B are flowcharts showing a method of controlling a gateway according to the disclosure.
Figure 9B:
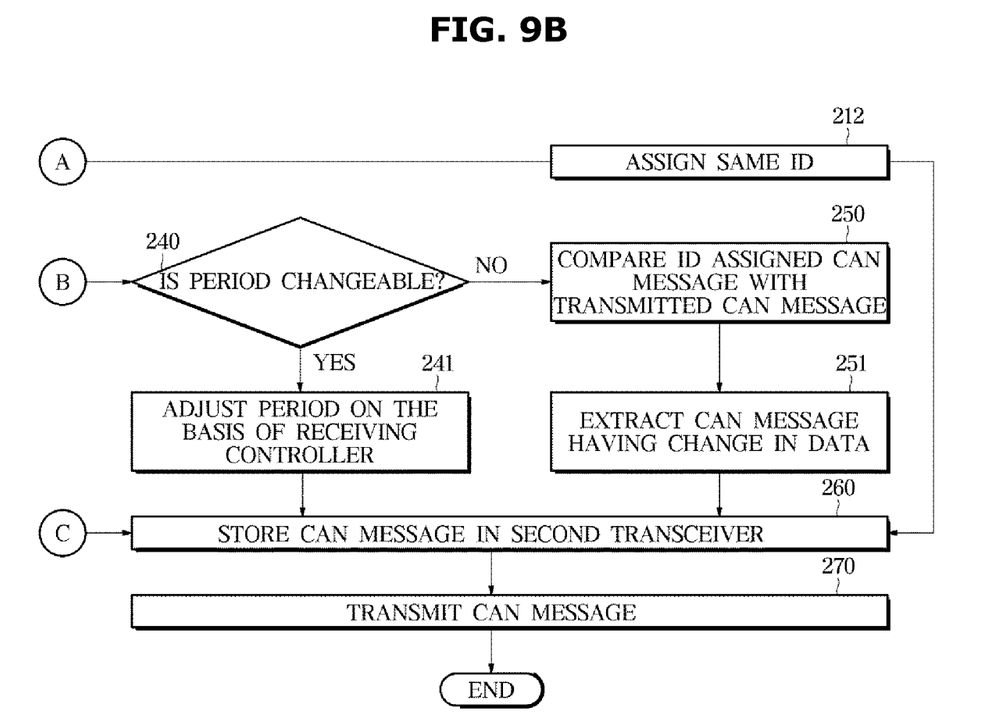

FIGS. 9A and 9B are flowcharts showing a method of controlling a gateway according to the disclosure, in which FIGS. 9A and 9B are described together in order to avoid redundancy.

Referring to FIGS. 9A and 9B, the gateway 100 receives a CAN-FD message (200).

The CAN-FD message 20 received by the gateway 100 may be received at a predetermined period according to the CAN-FD protocol.

The gateway 100 compares the size of the CAN-FD message 20 with preset reference bytes (210).

If the size of the CAN-FD message 20 is smaller than or equal to the preset reference bytes (A), the gateway 100 assigns the same ID to the CAN-FD messages 20 received at the preset period (212). The gateway 100 stores the CAN messages assigned the same ID in a transmission buffer, that is, the second transceiver 130 (260), and transmits the CAN messages (270).

Meanwhile, the preset reference bytes may be 8 bytes. However, the preset reference bytes may be changed by the CAN protocol applied to the vehicle 1.

If the size of the CAN-FD message 20 exceeds the preset reference bytes, the gateway 100 divides the CAN-FD message 20 by the reference bytes and assigns IDs to the divided CAN-FD messages (211).

For example, the gateway 100 may divide the CAN-FD message 20 having a frame size of 32 bytes into four messages each having 8 bytes. The gateway 100 may sequentially assign IDs to the four divided CAN-FD messages, to thereby generate four CAN messages 80.

The gateway 100 determines whether all of the generated plurality of CAN messages 80 need to be transmitted (220).

If all of the generated CAN message 80 needs to be transmitted (Yes in operation 220), the gateway 100 does not extract CAN messages.

For example, the received CAN-FD message 80 may include data related to the driving safety of the vehicle 1. In this case, the gateway 100 needs to transmit all of the generated CAN messages 80.

If all of the CAN messages 80 does not need to be transmitted (NO in operation 220), the gateway 100 extracts some of the plurality of CAN messages (221).

For example, if data contained in the received CAN-FD message 80 is not related to safety, the gateway 100 extracts some CAN messages that need to be transmitted among the plurality of generated CAN messages 80 and perform the subsequent operations.

The gateway 100 checks the bus load of the CAN bus 60 (230) and compares the bus load with a preset reference value (231).

If the bus load is less than or equal to the reference value C, the gateway 100 stores the CAN messages 80 in the second transceiver 130 (260), and transmits the stored CAN messages 80 according to a preset period (270).

In detail, when some of the generated CAN messages are extracted, the gateway 100 transmits the extracted some CAN messages as shown in FIG. 5. However, if all of the generated CAN messages need to be transmitted, the gateway 100 transmits all of the stored CAN messages 80 according to the preset period as shown in FIG. 3.

On the other hand, comparing the bus load with the reference value refers to determining the current communication state of the CAN bus 60. Since a bus load lower than the reference value indicates that large data may be easily transmitted, the gateway 100 may selectively determine whether to transmit all of the CAN messages 80 or some of the CAN messages 80. The reference value may be predetermined by the manufacturer and may be changed.

If the bus load of the CAN bus 60 exceeds the reference value (B), the gateway 100 determines whether change of the period is performable (240).

In detail, the gateway 100 may determine whether to change the period of transmitting the CAN message 80 based on the controller that is to receive the generated CAN message 80. For example, the generated CAN message 80 may include safety related data. In this case, the gateway 100 may determine that the change of the period is not performable. As another example, the gateway 100 may receive a request to change the preset period from the controller that is to receive the CAN message 80. In this case, the gateway may determine that the change of the period is performable.

If the change of the period is performable (Yes in operation 240), the gateway 100 adjusts the period based on the controller that is to receive the CAN message (241). The gateway 100 stores the CAN messages in the second transceiver 130 (260). The gateway 100 transmits the stored CAN messages 80 (270).

In detail, when the gateway 100 extracts some CAN messages among the plurality of generated CAN messages, the gateway 100 transmits the extracted CAN messages at the adjusted period as shown in FIG. 7. However, if all of the generated CAN messages need to be transmitted, the gateway 100 transmits all of the stored CAN messages 80 at the adjusted period as shown in FIG. 6.

If the change of the period is not performable (NO in operation 240), the gateway 100 compares the CAN message assigned with the ID with the most recently transmitted CAN message (250).

For example, the gateway 100 transmits a plurality of CAN messages generated from the first CAN-FD message 21. Thereafter, the gateway 100 may generate a plurality of CAN messages from the second CAN-FD message 22. The gateway 100 compares the CAN message generated from the first CAN-FD message 21 and having an ID of 0×101 with the CAN message generated from the second CAN-FD message 22 and having an ID of 0×101.

The gateway 100 extracts a CAN message having a change of data (251).

In the above example, data of a CAN message generated from the first CAN-FD message 21 and having an ID of 0×101 is not identical to data of a CAN message generated from the second CAN-FD message 22 and having an ID of 0×101, the gateway 100 determines that a change in data exists. The gateway 100 extracts the CAN message generated from the second CAN-FD message 22 and having an ID of 0×101.

The gateway 100 stores only the CAN messages extracted from the plurality of CAN messages generated from the second CAN-FD message 22 in the second transmitter 130 (260), and transmits the stored CAN messages at a predetermined period (270).

In detail, when the gateway 100 extracts some CAN messages from the plurality of generated CAN messages, the gateway 100 transmits only the CAN messages extracted through comparison with recently transmitted data. Even when all of the generated CAN messages are extracted. The gateway 100 transmits only some CAN message extracted through comparison with recently transmitted data. That is, when the bus load is large and the change of the period is not performable, the gateway 100 may reduce communication load by not transmitting redundant CAN data as shown in FIG. 8.

As is apparent from the above, the vehicle gateway and the method of controlling same can prevent a load from being increased at a reception side controller that uses CAN having a data size and a transfer rate different from those of CAN-FD and achieve efficient data transmission by dividing a CAN-FD message transmitted over CAN-FD.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combination as are within their true spirit and scope.

The invention claimed is:

1. A vehicle gateway comprising:
a first transceiver configured to receive a controller area network with a flexible data rate (CAN-FD) message from a CAN-FD bus and store the CAN-FD message;
a second transceiver configured to store a controller area network (CAN) message and transmit or receive the CAN message to or from a CAN bus; and
a processor configured to divide the CAN-FD message into a plurality of divided CAN-FD messages having a size of preset reference bytes when the CAN-FD message is larger than the preset reference byte, and assign identification numbers (IDs) to the plurality of divided CAN-FD messages, and configured to assign a same ID to the CAN-FD message without dividing when the CAN-FD message is the same size as the preset reference byte, and configured to store the CAN-FD messages assigned with IDs in the second transceiver as a plurality of CAN messages.

2. The vehicle gateway of claim 1, wherein the processor controls the second transceiver such that the plurality of CAN messages are transmitted based on a preset period.

3. The vehicle gateway of claim 1, wherein the processor determines whether the plurality of CAN messages need to be transmitted, and transmits at least one of the plurality of CAN messages based on the determination.

4. The vehicle gateway of claim 3, wherein the processor compares a bus load of the CAN bus with a reference value, and transmits at least one of the plurality of CAN messages based on the comparison.

5. The vehicle gateway of claim 4, wherein the processor determines whether to adjust a preset period when the bus load exceeds the reference value.

6. The vehicle gateway of claim 5, wherein the processor adjusts the preset period based on a controller that is configured to receive the plurality of CAN messages, and transmits the plurality of CAN messages based on the adjusted preset period.

7. The vehicle gateway of claim 6, wherein the processor adjusts the preset period based on a period requested by the controller to receive the plurality of CAN messages.

8. The vehicle gateway of claim 5, wherein the processor, based on whether the preset period has been adjusted, compares CAN messages divided from a first CAN-FD message and a second CAN-FD message that have the same ID.

9. The vehicle gateway of claim 8, wherein the processor transmits a CAN message having a change in data among the plurality of CAN messages based on the comparison.

10. A vehicle gateway comprising:
a first controller configured to generate a controller area network with flexible data rate (CAN-FD) message;
a second controller configured to generate a controller area network (CAN) message; and
the vehicle gateway configured to route the CAN-FD message and the CAN message,
wherein the vehicle gateway includes:
a first transceiver configured to receive the CAN-FD message from the first controller and store the CAN-FD message;
a second transceiver configured to store the CAN message and transmit or receive the stored CAN message to or from the second controller; and
a processor configured to divide the CAN-FD message into a plurality of divided CAN-FD messages having a size of preset reference bytes when the CAN-FD message is larger than the preset reference byte, and assign identification numbers (IDs) to the plurality of divided CAN-FD messages, configured to assign a same ID to the CAN-FD message without dividing when the CAN-FD message is the same size as the preset reference byte, and configured to store the CAN-FD messages assigned with the IDs in the second transceiver.

11. A method of controlling a vehicle gateway, the method comprising:
receiving, by a processor, a controller area network with a flexible data rate (CAN-FD) message from a CAN-FD bus generated by a controller;
dividing the CAN-FD message into a plurality of divided CAN-FD messages having a size of preset reference bytes when the CAN-FD message is larger than the preset reference byte;
assigning identification numbers (IDs) to the plurality of divided CAN-FD messages;
assigning a same ID to the CAN-FD message without dividing the CAN-FD message when the CAN-FD message is the same size as the preset reference byte;
storing the CAN-FD messages assigned with the IDs; and
transmitting the stored CAN-FD messages to a CAN bus.

12. The method of claim 11, further comprising transmitting the stored CAN-FD messages based on a preset period.

13. The method of claim 11, wherein the transmitting includes determining whether the stored CAN-FD messages need to be transmitted, and transmitting some of the stored CAN-FD messages based on the determination.

14. The method of claim 13, wherein the transmitting further includes comparing a bus load of the CAN bus with a reference value, and transmitting some of the stored CAN-FD messages based on the comparison.

15. The method of claim 13, where the transmitting further includes determining whether to adjust the preset period when the bus load exceeds the reference value.

16. The method of claim 15, wherein the transmitting further includes adjusting the preset period based on a controller that is to receive the stored CAN-FD messages, and transmitting the stored CAN-FD messages based on the adjusted preset period.

17. The method of claim 16, wherein the transmitting further includes adjusting the preset period based on a period requested by a controller that is to receive the stored CAN-FD messages.

18. The method of claim 15, wherein the transmitting further includes, based on whether the preset period has been adjusted, comparing CAN messages divided from a first CAN-FD message and a second CAN-FD message that have the same ID among the stored CAN-FD messages; and transmitting a CAN message having a change in data among the stored CAN messages based on the comparison.

\* \* \* \* \*